(No Model.)
W. H. HART.
MANUFACTURE OF CHAIN LINKS.
No. 489,252. Patented Jan. 3, 1893.
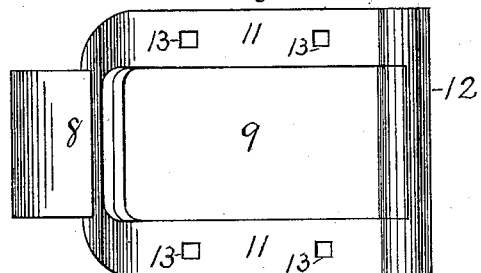
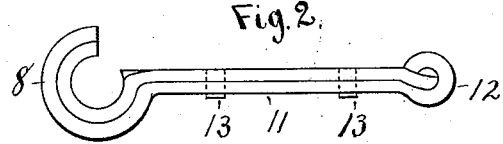
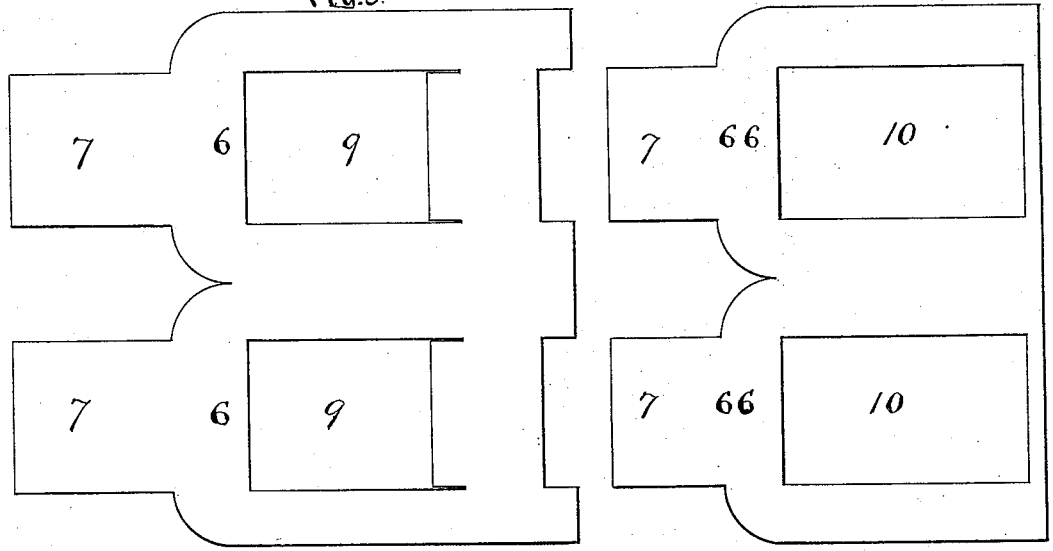
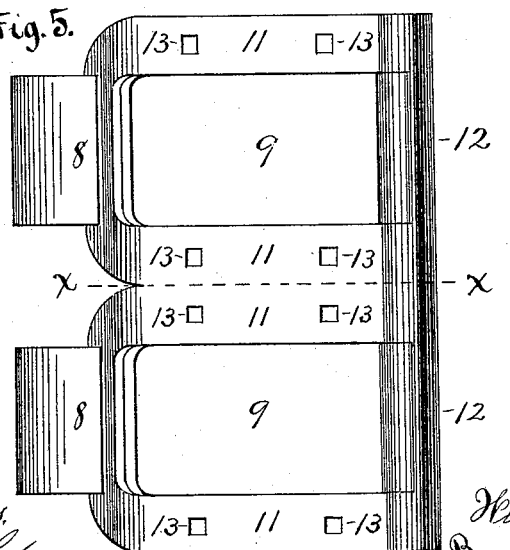
Witnesses.
Brayton L. Lewis.
F. H. Griswold.
Inventor.
William H. Hart.
By James Shepard
Atty.

UNITED STATES PATENT OFFICE.

WILLIAM H. HART, OF NEW BRITAIN, CONNECTICUT, ASSIGNOR TO THE STANLEY WORKS, OF SAME PLACE.

MANUFACTURE OF CHAIN-LINKS.

SPECIFICATION forming part of Letters Patent No. 489,252, dated January 3, 1893.

Application filed July 20, 1892. Serial No. 440,660. (No model.)

*To all whom it may concern:*

Be it known that I, WILLIAM H. HART, a citizen of the United States, residing at New Britain, in the county of Hartford and State of Connecticut, have invented a certain new Improvement in the Manufacture of Drive-Chains, of which the following is a specification.

My invention relates to improvements in the manufacture of drive chains, and the main object of my improvement is economy in production, particularly in the saving of labor.

In the accompanying drawings, Figure 1 is a plan view of a completed chain link as produced by my method. Fig. 2 is an edge view of the same. Fig. 3 is a plan view of a compound blank for use in the production of my chain links. Fig. 4 is a like view of a compound blank for forming the inner thickness of my chain links, said blanks Figs. 3 and 4 being the result of the first step in the process of manufacture. Fig. 5 is a plan view of two connected chain links as formed by my process ready to be made into separate links by severing on the line $x\,x$.

I have shown chain links herein as formed of two thicknesses of metal and of two separate pieces but my improvement is applicable to other known forms of links, as for instance where the two thicknesses consist of one piece doubled upon itself as in the two patents to Charles E. Hart dated June 7, 1892. My process is also applicable to a chain link in which the principal portions are of one thickness of metal, while the hook or knuckle is reinforced by an additional thickness, as for example in the patent to Caldwell No. 307,011, October 21, 1884 or to a chain link of a single thickness throughout as in the patent to Corscaden No. 467,659, January 26, 1892 and to various other chain links which differ no more from these than the several links thus referred to differ from each other.

When the link is formed in two thicknesses and of separate pieces in the side bars and knuckle, I form them by cutting out with dies, long blanks Fig. 3 for the outer thickness, and shorter blanks Fig. 4 for the inner thickness, but whether there are two thicknesses or only one I form two or more blanks 6, 6, or 66, in a connected sheet as shown in Figs. 3 and 4 with tongues 7 cut from one edge of the sheet from which tongues I form the hook or knuckle portion 8 of the chain link. I also cut out central openings as at 9, 9, and 10, 10, which openings are substantially in alignment with the tongues 7 7. The metal upon each side of these openings 9 will form the side bars 11 in the complete chain link. The cross bars at the end of the blank opposite the tongues 7 will in the completed link be formed into the pintle portion 12. I also connect the two thicknesses of metal in the side bars 11 by means of slugs or punchings 13 cut and punched from the thicknesses thereof but without forcing them therefrom.

The general form of the link, as well as the punchings for fastening the two thicknesses of the side bars together is shown and described in a prior application of mine, Serial No. 431,563 filed May 2, 1892, and consequently the same is not herein claimed. After two or more blanks have been cut out to form the tongue 7 and openings 9 and 10 said thicknesses are placed together and the knuckles and pintles 8 and 12 rolled or formed up in the ordinary manner, excepting that the operation of rolling said knuckles and pintle portion is performed on a blank that is wide enough for making two or more chain links, so that one operation rolls the knuckles and pintles on the entire series of connected blanks, whether the series consists of two or more, instead of performing this operation separately on the blank for each chain link. In like manner, the punchings 13 for all of the connected blanks may be made at one operation instead of necessitating a different operation for each chain link. After the various operations have been performed simultaneously on each of the connected blanks, they are severed into finished chain links by cutting them on the line $x\,x$ of Fig. 5. This may be readily done in dies which have a shear action by merely shaping the face of the dies so as to substantially fit the pintle portion of the links whereby said portion may be separated squarely and without flattening.

While I have shown only two connected links in one blank it is obvious that three or more may be thus connected and that the various operations can be readily performed on a series of these connected blanks substantially as quickly as the same operations can be performed on a blank for a single chain link. It is also evident that when three blanks instead of two are thus connected side by side, the advantage of less handling in performing these operations on the three blanks at once, will be proportionately greater than it is when the same operations are performed upon a series of only two connected blanks.

By referring to the patents heretofore named, it can be readily seen that two or more connected blanks may be formed side by side and the various operations performed on the connected blanks, each of which may be finished by merely severing them from each other, whether the links or parts of the link consist of only one thickness or more than one thickness. The blanks for the knuckles or hooks will be cut from one edge of the metal, and the openings 9 or 10 cut from between the side bars as the first operation and then the knuckles and pintles may be formed on each of the connected blanks, after which the links may be completed by severing the blanks on a line, which in the completed link, forms the outer edge of the side bars. In some cases and with some forms of links, the openings between the side bars might be punched after the knuckle portion has been rolled, but even in this case, the advantage of rolling the knuckles for two or more chain links at one operation would be attained, and so also the openings between the side bars of two or more chain links might be made at one and the same operation.

I claim as my invention—

1. That improvement in the manufacture of drive chain links which consist of first forming a series of connected blanks side by side, each having the knuckle blank formed thereon, simultaneously forming the tongues for two or more links into knuckles and also simultaneously forming the pintle portions of two or more connected blanks, and then severing the blanks into individual chain links on lines that form the outer edge of the side bars, substantially as described and for the purpose specified.

2. The method of manufacturing chain links which consists in simultaneously rolling the hook or pintle portion of two or more connected blanks and simultaneously forming the pintle portion of two or more connected blanks, and then dividing the same into individual links by severing on a line that forms the outer edge of the side bars and end of the pintle portion, substantially as described and for the purpose specified.

WM. H. HART.

Witnesses:
BRAYTON S. LEWIS,
JAMES SHEPARD.